April 23, 1929. A. B. FAHNESTOCK 1,709,902
APPARATUS FOR FEEDING AND BURNING FUEL
Filed April 7, 1927 5 Sheets-Sheet 4

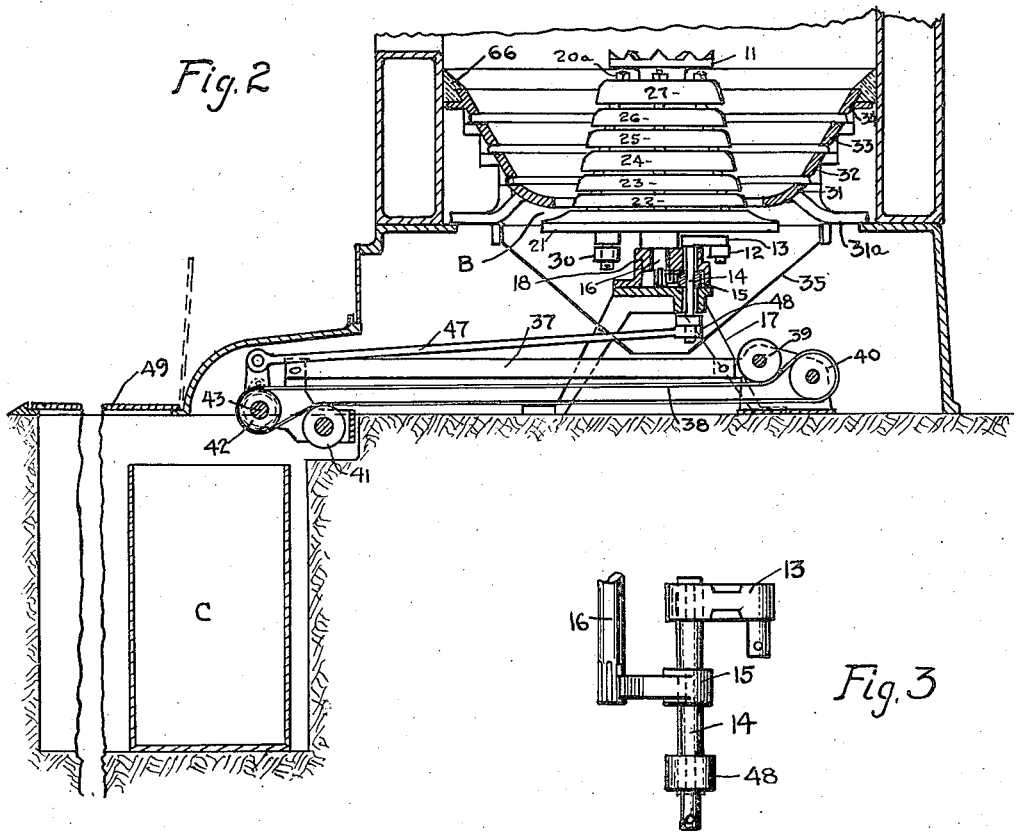

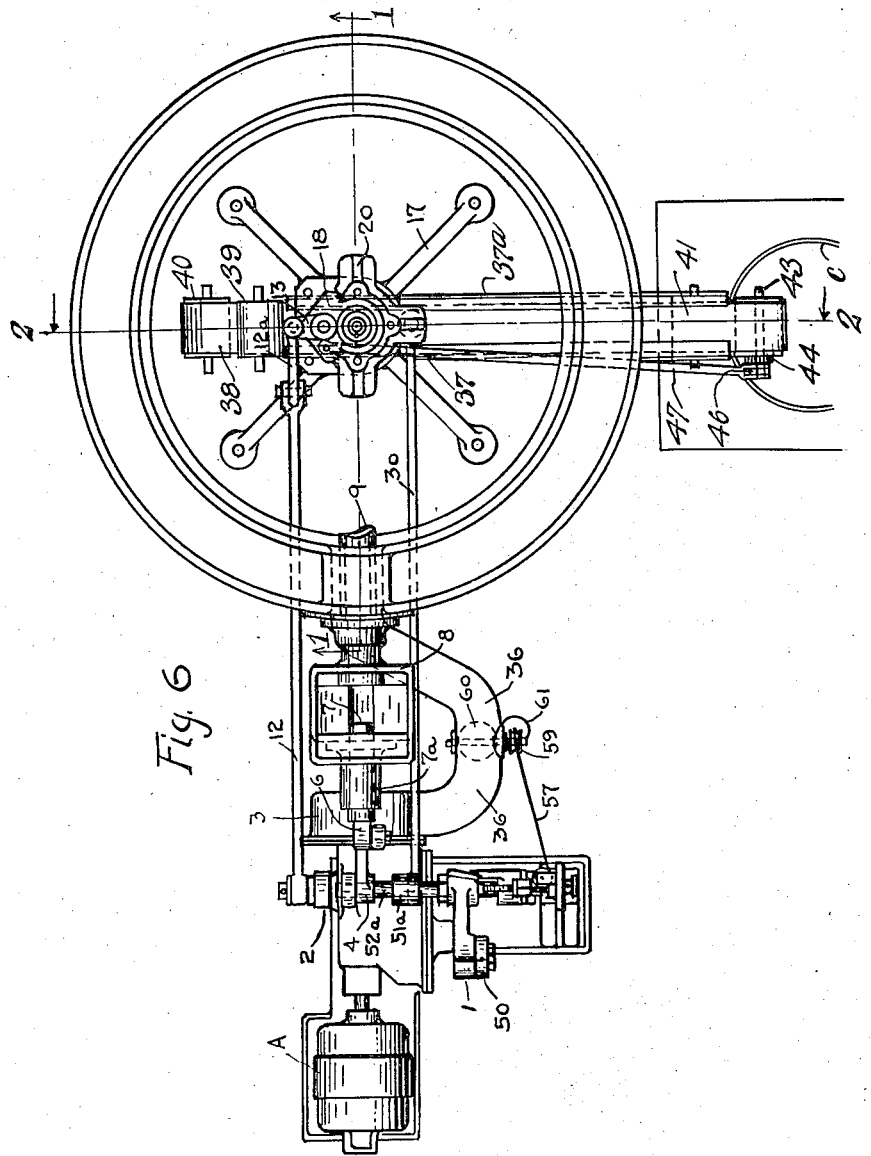

WITNESSES
INVENTOR
Adam B. Fahnestock

April 23, 1929.   A. B. FAHNESTOCK   1,709,902
APPARATUS FOR FEEDING AND BURNING FUEL
Filed April 7, 1927   5 Sheets-Sheet 5
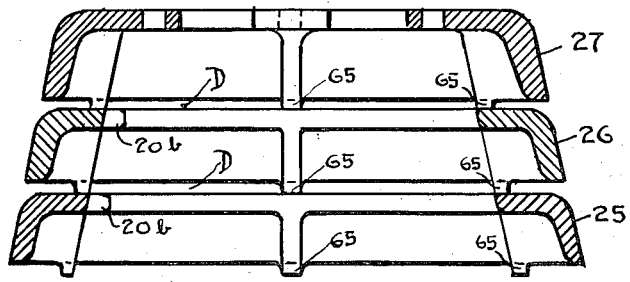
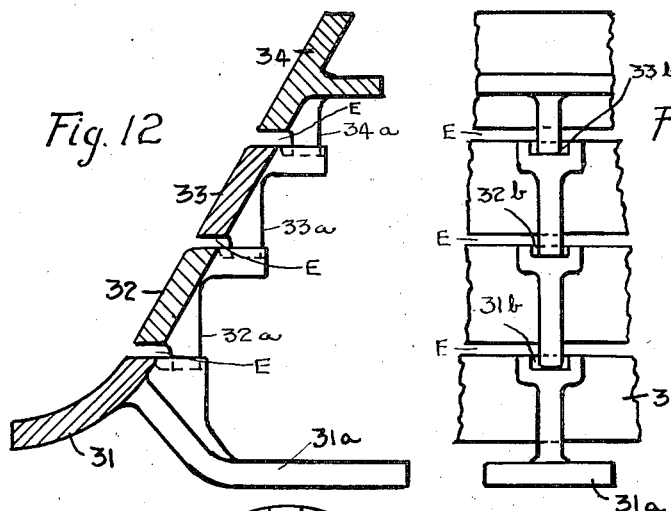
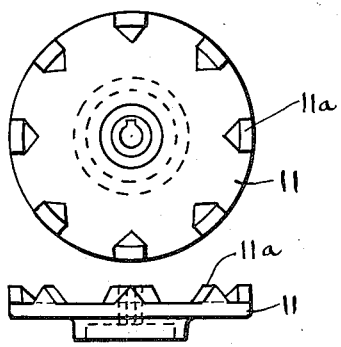
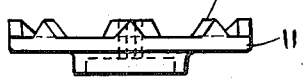
WITNESSES                           INVENTOR
  Adam D. Fahnestock Patented Apr. 23, 1929.

1,709,902

UNITED STATES PATENT OFFICE.

ADAM B. FAHNESTOCK, OF MANHASSET, NEW YORK.

APPARATUS FOR FEEDING AND BURNING FUEL.

Application filed April 7, 1927. Serial No. 181,725.

My invention relates to an apparatus for feeding and burning solid fuel, and conveying the resulting ashes to an ash pit, and has for an object the provision of an apparatus whereby the quantity of fuel fed to the grate of a stationary furnace, the rate of oscillation of the grate, and the quantity of air supplied as draft, can be regulated as desired, a variation in the rate of fuel feed, effecting automatically and simultaneously a variation, in direct proportion, both of the extent of oscillation of the grate, and the quantity of air supplied for draft.

Another object of my invention is to provide means for feeding and burning solid fuel, whereby a substantial economy is effected.

Further objects of my invention are to automatically distribute the fuel efficiently over the grate, and convey the ashes from the furnace to a suitable ash pit.

The improvement claimed is hereinafter fully set forth.

Figure 1:
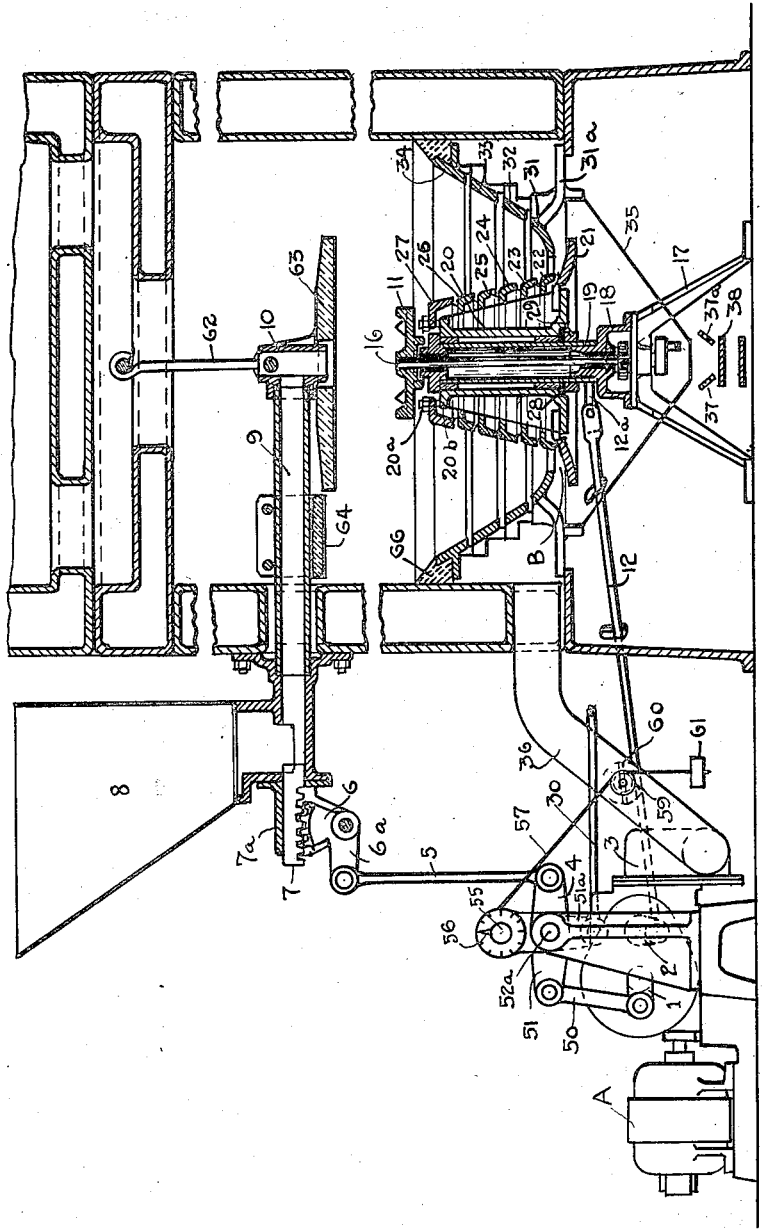
Figure 7:
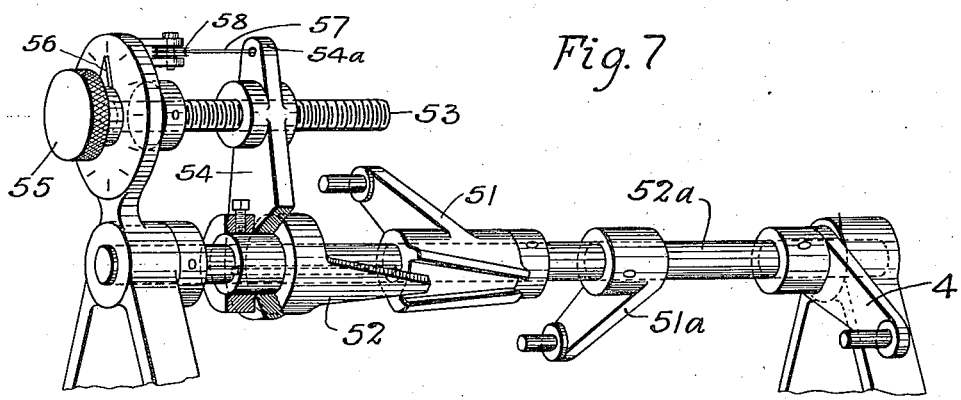
Figure 8:
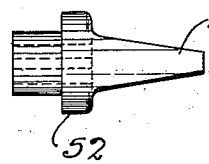
Figure 8A:
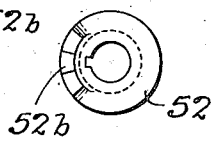
Figure 9:
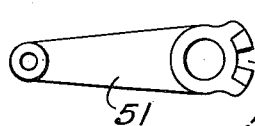
Figure 9A:
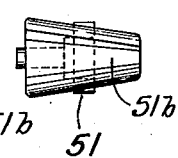
Figure 10:
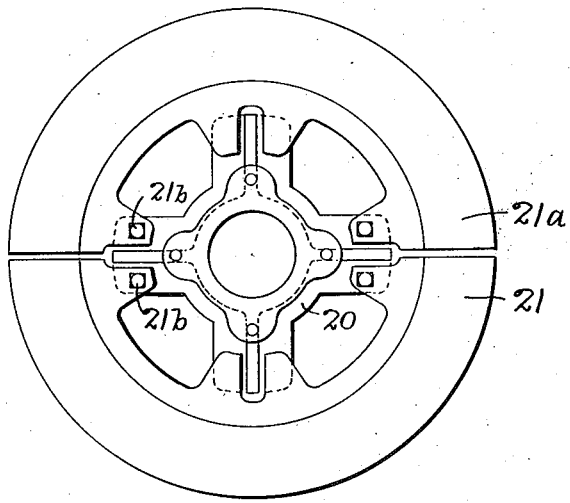

In the accompanying drawings: Figure 1 is a view, partly in elevation and partly in vertical section, on the line 1—1, of Fig. 6, of a furnace equipped with my improved apparatus; Fig. 2, a vertical section taken on the line, 2—2, of Fig. 6; Figs. 3 and 4, plan and end views, respectively, showing details of the mechanism for driving the distributing plate; Fig. 5, an end view of the mechanism for driving the ash conveying belt; Fig. 6, a plan view of the mechanism shown in Fig. 1, the grate and the fuel hopper being removed; Fig. 7, a view, in perspective, showing details of the control mechanism; Figs. 8 and $8^a$, a side and an end view, respectively, of the tongue member of the clutch; Figs. 9 and $9^a$, a side and an end view, respectively, of the jaw member of the clutch; Fig. 10, a plan view of the support for the oscillating grate, the lower grate section being shown in place; Fig. 11, a central vertical section, of the three upper sections of the oscillatory grate; Fig. 12, a vertical section, taken through one side of the lower oscillatory grate section; Fig. 13, a fragmentary view, showing details of the means for supporting the outer grate section; and, Figs. 14 and $14^a$, plan and a side view, respectively, of the distributor plate.

In the practice of my invention, referring descriptively to the specific embodiment thereof which is herein exemplified, a motor, A, drives through a reducing gear of usual type, an arm, 1, at about six revolutions a minute, and an arm, 2, at about thirty revolutions a minute. The motor also drives a blower, 3, of usual type, for supplying the necessary draft to the grates.

The arm, 1, drives through a link, 50, an arm, 51, attached to a hub, $51^b$, oscillatable on the shaft, $52^a$. The hub is formed with recesses to provide radial jaw bearing faces. A sleeve coupling member, 52, adapted to be moved longitudinally along the shaft, $52^a$, but to rotate therewith, is provided with a tapered tongue, $52^b$, adapted to enter the recess in the hub $51^b$. The maximum width of the angular recess in the hub is equal to the length of the arc traversed by the hub in each oscillatory movement thereof, plus the width of the outer end of the tongue, $52^b$. By moving the sleeve, 52, along the shaft, so as to vary the distance the tongue enters the recess, the length of the arc of oscillation of the shaft, $52^a$, may be varied as desired. In Patent 1,323,972, issued to me December 2, 1919, I have described in detail the features of the tongue and recess, variable traverse, driving mechanism.

The drive for reciprocating the fuel feeding plunger, 7, comprises an arm, 4, rigidly secured to the shaft, $52^a$, which arm imparts through the link, 5, oscillatory movement to the arm $6^a$, of the segment, 6, having suitable teeth meshing with the teeth of a rack attached to the plunger. A casing $7^a$, attached to the conveyor tube, 9, guides the plunger. Fuel, such as buckwheat or rice coal, falls by gravity from the hopper, 8, into the conveyor tube, 9, through which it is forced by the plunger to the T-shape pipe, 10, supported over the grate. From the pipe, 10, the fuel falls by gravity to the rotating distributing plate, 11.

A stationary outer grate, and a rotary, oscillatory central grate, are disposed within the firebox of the furnace. The stationary grate comprises the four superposed annular sections, 31, 32, 33, 34. The sections are spaced apart, to provide suitable air spaces for draft, by depending lugs, $32^a$, $33^a$, and $34^a$, which are respectively fitted in the pockets, $31^b$, $32^b$, and $33^b$, of the sections. The bottom section, 31, is formed with horizontal lugs, $31^a$, by which it is attached to the wall of the firebox. Vertical lugs depend from the horizontal lugs, for the attachment of the ash hopper, 35. The space between the top grate sections, 34, and the walls of the fire box is sealed with a filler of fire clay, 66.

The central grate comprises seven superposed circular sections, 21, 22, 23, 24, 25, 26, and 27, which are mounted on the tubular casting, 20. To ensure the proper alignment of the circular sections, they are provided with lugs, $20^b$, which engage radial ribs on the tubular casting. Bolts, $20^a$, secure the upper section to a horizontal flange on the upper end of the tubular casting, and bolts, $21^b$, secure the lower section to a flange on the lower end of the casting. Air spaces are provided between the respective sections, by the depending lugs, 65.

The central grate is disposed above the bottom of the furnace on a support, 17, on which support is mounted a gear casing, 18, formed with a vertical extension to which is attached a cylindrical member, 19, which forms a housing for the shaft, 16, for driving the distributor plate, 11. A plate having a bearing for the shaft, 16, is attached to the top of the cylindrical member, 19, and a thrust collar, 29, on which the thrust bearing, 28, of the tubular casting, 20, rests, is attached to the lower end of the cylindrical member.

The mechanism for simultaneously varying the rate of oscillation of the central grate, the rate of feed of the fuel to the grates, and the quantity of air supplied to the grates, comprises a yoke, 54, having one end loosely mounted on the sleeve coupling member, 52. A threaded opening for an adjusting screw, 53, is provided near the other end of the yoke. A knob, 55, for effecting adjustment of the screw, and a pointer, 56, for indicating the amount of adjustment, are both provided on the screw. Turning of the knob, causes the coupling member, 52, to move forward, or backward, longitudinally of the shaft, $52^a$, with consequent variation of the oscillatory traverse of the shaft. Thus, the length of the stroke of the plunger, 7, with consequent variation of the quantity of fuel fed to the grates, may be regulated as desired.

To effect the necessary forced draft, a conduit, 36, is provided to convey air from the blower, 3, to the bottom of the furnace. The quantity of air passed through the conduit can be regulated by the damper, 60, which is controlled by a cable, 57, passing over the pulleys, 58 and 59, the latter pulley, being mounted on the operating shaft of the damper. One end of the cable is attached to the lug, $54^a$, on the yoke, and the other end is provided with a weight to supply the proper tension. Movement of the yoke, causes the cable to turn the damper, and thus the damper may be adjusted to supply the air for draft, at any desired rate.

In order to vary the extent of oscillation of the central grate, in proportion to the quantity of fuel fed, an arm, $51^a$, is rigidly mounted on one end of the shaft, $52^a$, to impart reciprocating motion to the connecting rod, 30, which is attached by a suitable pivot pin to the tubular casting, 20. Variation of the arc of oscillation of the shaft, $52^a$, produces consequent variation in the arc of oscillation of the central grate.

To provide for rotating the distributor plate, alternately in opposite directions, and conveying the ashes to the ash pit, there is formed on the gear case, 18, suitable bearings for a shaft, 14. The shaft carries at one end an arm, 13, which is connected by the link, $12^a$, and rod, 12, to the crank, 2. Rotation of the crank, 2, produces oscillation of the shaft. Keyed to the shaft is a segment 15, having teeth which mesh with the teeth of a gear wheel mounted on the shaft, 16. Oscillation of the shaft, 14, produces oscillation of the segment, 15, and consequent rapid rotation, alternately in opposite directions, of the distributor plate 11. Preferably the distributor plate is rotated one and one-half revolutions in each direction. The upper face of the plate, on which the fuel falls from the T-pipe, 10, is provided with tapered lugs, $11^a$, which serve to break up compact masses of fuel, thus ensuring an even fuel distribution to the grate.

The ashes which are shaken down by the oscillatory movements of the grate, drop through the opening, B, between the central and outer grates, onto the conveyor belt, 38, which runs on pulleys, 39, 40, 41 and 42. The pulley, 42, is mounted rigidly on the shaft, 43, which carries the ratchet wheel, 44. An arm, 46, is freely mounted on the shaft, 43, and carries a pawl, 45. The arm, 46, is connected by the rod, 47, to an arm, 48, on the end of the shaft, 14. Oscillation of the shaft, 14, thus produces rotation of the ash conveyor belt, with the resulting discharge of the ashes into the pit, C. Guide bars, 37, $37^a$, are provided along the sides of the conveyor belt, to keep the ashes on the belt.

The end of the fuel conveyor tube, 9, which extends into the fire box is supported by a rod, 62, connected to the T-pipe, 10, and is heat insulated, for part of its length by a U-shaped fire brick, 64, and for the remainder of its length by the fire brick baffle, 63. The baffle also serves to effect proper distribution of the heat.

So far as I am aware it is broadly novel to simultaneously, and automatically, vary, in direct proportion to the quantity of solid fuel fed to the grate, the quantity of draft air, supplied to the grate, and the rate of rotation, or oscillation, of the grate.

I claim as my invention and desire to secure by Letters Patent:

1. A furnace comprising inner and outer relatively movable concentric grate sections providing an annular container for the fire bed, a rotary distributor plate mounted above the inner section, means for actuating the distributor plate to throw the fuel to the various portions of the fire bed, and means for feeding the fuel to said distributor plate.

2. A furnace comprising an inner oscillatory grate, an outer stationary grate spaced from the inner grate to provide an annular container for the fire bed and an ash discharge opening at the lower portions of said grates, a rotary distributor plate mounted above the inner grate, means for actuating the distributor plate to throw the fuel to the various portions of the fire bed, and means for feeding the fuel to said distributor plate.

3. A furnace comprising an inner frusto-conical oscillatory grate, an outer stationary bowl-shaped grate concentric therewith, said grates being arranged to provide an annular container for the fire bed and an ash discharge opening about their lower edges, a rotary distributor plate mounted above the inner grate, means for actuating the distributor plate to throw the fuel to the various portions of the fire bed, and means for feeding the fuel to said distributor plate.

4. A furnace comprising an inner frusto-conical grate including annular sections separated by peripheral spaces, an outer stationary bowl-shaped grate concentric therewith including similarly separated annular sections, a rotary distributor plate mounted above the inner grate, means for actuating the distributor plate to throw the fuel to the various portions of the fire bed, and means for feeding the fuel to said distributor plate.

5. A furnace comprising an inner frusto-conical grate including annular sections separated by peripheral spaces, an outer stationary bowl-shaped grate concentric therewith including similarly separated annular sections, a rotary distributor plate, a shaft concentric with the inner grate supporting said distributor plate above the grate, means for operating the shaft to cause the distributor plate to throw the fuel to the various portions of the fire bed, and means for feeding the fuel to said distributor plate.

6. A furnace comprising an inner frusto-conical oscillatory grate, an outer stationary bowl-shaped grate concentric therewith, said grates being arranged to provide an ash discharge opening about their lower edges, a rotary distributor plate mounted above the inner grate, means for actuating the distributor plate to throw the fuel to the various portions of the fire bed, means for feeding fuel to said distributor plate, and common means for varying the rate of operation of the feeding means and the extent of oscillation of the inner grate.

ADAM B. FAHNESTOCK.